(12) United States Patent
Sauder et al.

(10) Patent No.: US 11,558,994 B2
(45) Date of Patent: Jan. 24, 2023

(54) AGRICULTURAL DATA ANALYSIS

(71) Applicant: Climate LLC, San Francisco, CA (US)

(72) Inventors: Doug Sauder, Livermore, CA (US); Cory Muhlbauer, Bloomington, IL (US); Justin Koch, Morton, IL (US)

(73) Assignee: CLIMATE LLC, San Francisco, CA (US)

( * ) Notice: Subject to any disclaimer, the term of this patent is extended or adjusted under 35 U.S.C. 154(b) by 7 days.

(21) Appl. No.: 17/063,555

(22) Filed: Oct. 5, 2020

(65) Prior Publication Data

US 2021/0015024 A1   Jan. 21, 2021

Related U.S. Application Data

(63) Continuation of application No. 15/578,658, filed as application No. PCT/US2016/035840 on Jun. 3, 2016, now Pat. No. 10,791,666.

(Continued)

(51) Int. Cl.
  *G06Q 30/00*       (2012.01)
  *A01B 79/00*       (2006.01)
  (Continued)

(52) U.S. Cl.
  CPC ............ *A01B 79/005* (2013.01); *A01B 79/02* (2013.01); *A01G 7/06* (2013.01); *G01C 21/3407* (2013.01);
  (Continued)

(58) Field of Classification Search
  CPC ........ A01B 79/005; A01B 79/02; A01G 7/06; G01C 21/3407; G01C 21/36;
  (Continued)

(56) References Cited

U.S. PATENT DOCUMENTS 6,505,146 B1   1/2003   Blackmer
7,047,135 B2   5/2006   Dyer et al.
(Continued)

FOREIGN PATENT DOCUMENTS

CA   2283767 A1   3/2001
CA   2956205 A1   12/2015
(Continued)

OTHER PUBLICATIONS

Reimann, Clemens, et al., "The concept of compositional data analysis in practice—total major element concentrations in agricultural and grazing land soils of Europe." Science of the total environment 426 (2012): 196-210. (Year: 2012).*
(Continued)

*Primary Examiner* — Joseph M Waesco
*Assistant Examiner* — Jay-Ming Wang
(74) *Attorney, Agent, or Firm* — Harness, Dickey & Pierce, P.L.C.

(57) ABSTRACT

Described herein are systems and methods for agricultural data analysis. In one embodiment, a computer system for monitoring field operations includes a database for storing agricultural data including yield and field data and at least one processing unit that is coupled to the database. The at least one processing unit is configured to execute instructions to monitor field operations, to store agricultural data, to automatically determine whether at least one correlation between different variables or parameters of the agricultural data exceeds a threshold, and to perform analysis of the agricultural data to identify a category of man-made issues or other issues that have potentially caused the correlation when at least one correlation occurs between different variables or parameters of the agricultural data.

20 Claims, 11 Drawing Sheets

Related U.S. Application Data

(60) Provisional application No. 62/172,715, filed on Jun. 8, 2015.

(51) Int. Cl.

| | | |
|---|---|---|
| *A01B 79/02* | (2006.01) | |
| *A01G 7/06* | (2006.01) | |
| *G01C 21/34* | (2006.01) | |
| *G01C 21/36* | (2006.01) | |
| *G06Q 10/06* | (2012.01) | |
| *G06Q 50/02* | (2012.01) | |
| *G09B 5/02* | (2006.01) | |
| *A01C 21/00* | (2006.01) | |

(52) U.S. Cl.
CPC ....... *G01C 21/36* (2013.01); *G06Q 10/06395* (2013.01); *G06Q 50/02* (2013.01); *G09B 5/02* (2013.01); *A01C 21/005* (2013.01); *A01C 21/007* (2013.01)

(58) Field of Classification Search
CPC ............. G06Q 10/06395; G06Q 50/02; G06Q 10/06398; G06Q 10/00; G06Q 10/02; G06Q 10/06; G06Q 10/10; G06Q 30/02; G09B 5/02; A01C 21/005; A01C 21/007
See application file for complete search history.

(56) References Cited

U.S. PATENT DOCUMENTS

| | | | |
|---|---|---|---|
| 8,855,937 B2 | 10/2014 | Lindores | |
| 2005/0234691 A1 | 10/2005 | Singh et al. | |
| 2006/0025927 A1* | 2/2006 | Hoskinson | A01B 79/005 702/1 |
| 2006/0282299 A1* | 12/2006 | Avey | G06Q 30/0631 705/26.7 |
| 2006/0282467 A1 | 12/2006 | Peterson | |
| 2012/0036130 A1* | 2/2012 | Light | G06F 40/30 707/769 |
| 2013/0018586 A1* | 1/2013 | Peterson | G06Q 50/02 702/19 |
| 2013/0324161 A1* | 12/2013 | Rhoads | G01C 21/36 455/456.3 |
| 2014/0012732 A1 | 1/2014 | Lindores | |
| 2014/0201191 A1 | 7/2014 | Karmarkar | |
| 2015/0040473 A1 | 2/2015 | Lankford | |
| 2015/0066884 A1 | 3/2015 | Tomarkin | |
| 2015/0370935 A1* | 12/2015 | Starr | G06Q 50/02 703/11 |
| 2016/0302351 A1* | 10/2016 | Schildroth | A01B 79/005 |
| 2016/0309646 A1* | 10/2016 | Starr | A01C 21/007 |
| 2017/0196171 A1* | 7/2017 | Xu | A01G 22/00 |
| 2017/0316124 A1* | 11/2017 | Lee | A01B 79/005 |
| 2018/0146612 A1* | 5/2018 | Sauder | A01B 79/005 |
| 2019/0057461 A1* | 2/2019 | Ruff | G06Q 50/02 |

FOREIGN PATENT DOCUMENTS

| | | |
|---|---|---|
| JP | 2015000049 A | 1/2015 |
| WO | WO 01/97097 A1 | 12/2001 |
| WO | WO 2014/036281 A2 | 3/2014 |

OTHER PUBLICATIONS

Search Report in application No. 16 808 071.1, dated Apr. 3, 2020, 3 pages.
International Searching Authority, "Search Report" in application No. PCT/US16/35840, dated Oct. 11, 2016, 16 pages.
International Bureau, "Preliminary Report on Patentability" in application No. PCT/US2016/035840, dated Dec. 21, 2017, 11 pages.
European Patent Office, "Search Report" in application No. 16808071.1-1006, dated Sep. 27, 2018, 9 pages.
European Claims in application No. 16808071.1-1006, dated Sep. 2018, 3 pages.
Current Claims in application No. PCT/US2016/03584, dated Dec. 2017, 6 pages.
Current Claims in application No. 16 808 071.1, dated Apr. 2020, 3 pages.
Cooke et al., "Aversion and Crop Complexity Empirical Empirical Test of an Argicultural Landscape Model: The Importance of Farmer Preference for Risk", SAGE Open, dated 2013.
Brazil Patent Office, "Search Report" in application No. BR1120170264374, dated Jan. 7, 2020, 2 pages.
Brazil Claims in application No. BR1120170264374, dated Jan. 2020, 4 pages.
Australian Patent Office, "Search Report" in application No. 2016/274391, dated Mar. 17, 2020, 4 pages.
Australian Claims in application No. 2016/274391, dated Mar. 2020, 4 pages.
Sauder, U.S. Appl. No. 15/578,658, filed Nov. 30, 2017, Office Action, dated Apr. 30, 2020.
Sauder, U.S. Appl.. No. 15/578,658, filed Nov. 30, 2017, Notice of Allowance, dated Jul. 8, 2020.
Sauder, U.S. Appl. No. 15/578,658, filed Nov. 30, 2017, Interview Summary, dated May 29, 2020.
Ukranian Institute of Intellectual Property, "Preliminary conclusion of the substantive examination", in Ukranian Application No. a201800194, dated Jun. 7, 2021, 11 pages.
Pending Claims, in Ukranian Application No. a201800194, dated Jun. 7, 2021, 5 pages.
European Patent Office, "Extended European Search Report" in application No. 21160475.6-1004, dated Jul. 13, 2021, 7 pages.
Claims in European Patent Office application No. 21160475.6, dated Jul. 13, 2021, 2 pages.

* cited by examiner (a)
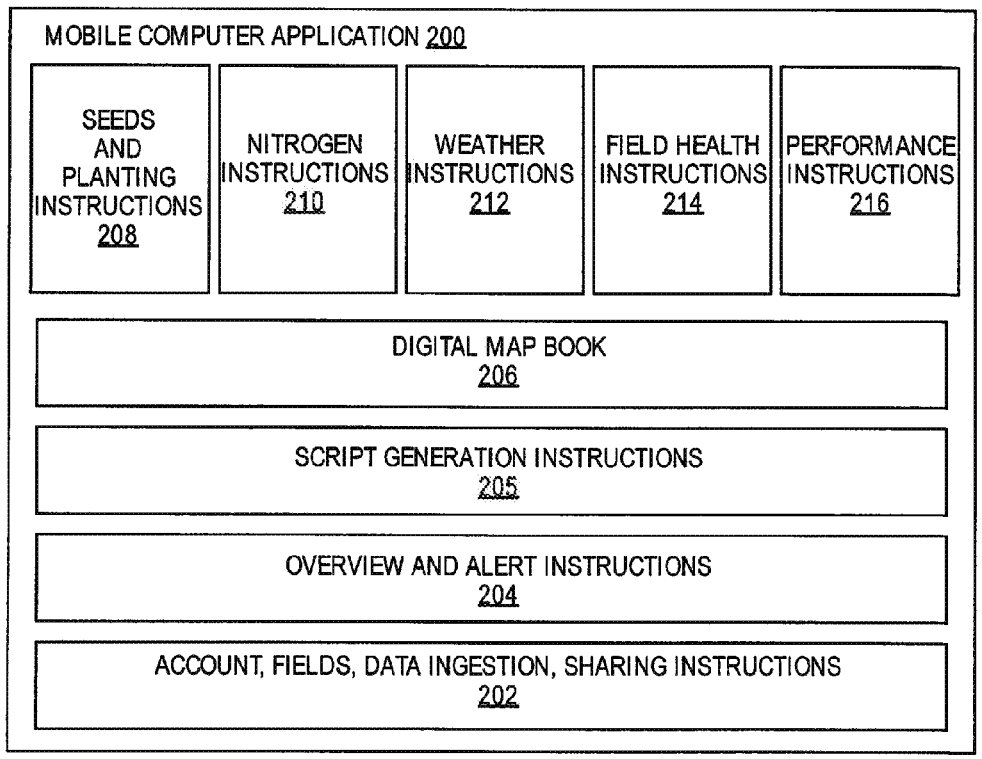
(b)
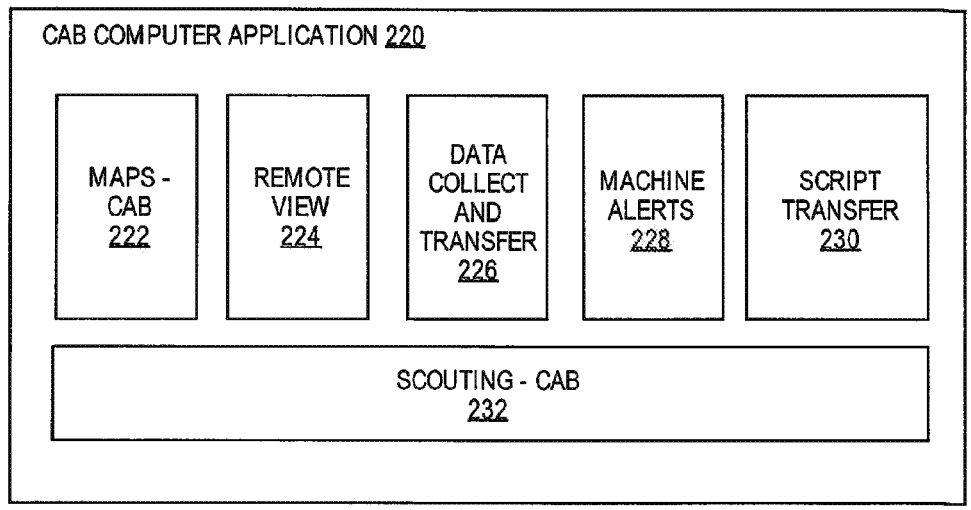
FIG. 2

FIG. 5

Data Manager

[ Nitrogen | Planting | Practices | Soil ]

| Planting 1(4 Fields) | Planting 2(0 Fields) | Planting 3(0 Fields) | Planting 4(1 Fields) | Add New Planting Plan |
|---|---|---|---|---|
| Crop Corn Product | Crop Corn Product | Crop Corn Product | Crop Corn Product | |
| Plant Date: 2016-04-12 | Plant Date: 2016-04-15 | Plant Date: 2016-04-13 | Plant Date: 2016-04-13 | |
| ILU 112 \| Pop: 34000 | ILU 83 \| Pop: 34000 | ILU 83 \| Pop: 34000 | ILU 112 \| Pop: 34000 | |
| [Edit] [Apply] | [Edit] [Apply] | [Edit] [Apply] | [Edit] [Apply] | |

601

| | CROP | PLANTED ACRES | PRODUCT | RELATIVE MATURITY | TARGET YIELD | POPULATION(AVG) | PLA |
|---|---|---|---|---|---|---|---|
| ☐ Select All | | | | | | | |
| ☐ Ames, IA 1<br>Corn \| 100 \| Boone, IA | Corn | — | DMC82-M | 112 | 160 | 34000 | Apr |
| ☐ Austin, MN 1<br>Corn \| 100 \| Fredricks, MN | Corn | — | DMC82-M | 114 | 160 | 36000 | Apr |
| ☐ Boone, IN 1<br>Corn \| 100 \| Boone, IA | Corn | — | DMC82-M | 112 | 150 | 34000 | Apr |
| ☐ Champaign 1<br>Corn \| 100 \| Champaign, IL | Corn | — | — | — | 200 | 34000 | Apr |
| ☐ E Nebraska 1<br>Corn \| 100 \| Burt, NE | Corn | — | — | 112 | 160 | 34000 | Apr |

FIG. 6

AGRICULTURAL DATA ANALYSIS

RELATED APPLICATIONS

This application claims the benefit under 35 U.S.C. § 120 as a Continuation of application Ser. No. 15/578,658, filed Nov. 30, /2017, which is a U.S. National Stage Patent Application filed under 35 U.S.C. § 371 of International Patent Application PCT/US2016/035840 filed Jun. 3, 2016, which claims the benefit of U.S. Provisional Application No. 62/172,715 filed on Jun. 8, 2015, the entire contents of which are hereby incorporated by reference. Applicant hereby rescinds any disclaimer of claim scope in the parent applications or the prosecution history thereof and advises the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2016 The Climate Corporation.

TECHNICAL FIELD

Embodiments of the present disclosure relate to systems and methods for agricultural data analysis.

BACKGROUND

Planters are used for planting seeds of crops (e.g., corn, soybeans) in a field. Some planters include a display monitor within a cab for displaying a coverage map that shows regions of the field that have been planted. The coverage map of the planter is generated based on planting data collected by the planter. Swath control prevents the planter from planting in a region that has already been planted by the same planter.

A combine harvester or combine is a machine that harvests crops. A coverage map of a combine displays regions of the field that have been harvested by that combine. A coverage map allows the operator of the combine know that a region of the field has already been harvested by the same combine. The operator may have difficulty operating the machine, operating the implement, and analyzing the data and maps provided by the display monitor in a timely manner.

SUMMARY

In one embodiment, a computer system for monitoring field operations includes a database for storing agricultural data including yield and field data and at least one processing unit coupled to the database. The at least one processing unit is configured to execute instructions to monitor field operations, to store agricultural data, to automatically determine whether at least one correlation between different variables or parameters of the agricultural data exceeds a threshold, and to perform analysis of the agricultural data to identify a category of man-made issues or other issues that have potentially caused the correlation when at least one correlation occurs between different variables or parameters of the agricultural data.

In one example, the at least one processing unit is further configured to execute instructions to check for a potential irrigation issue for a particular field by determining if crop yield for the field has a geometric pattern including a circular pattern or a linear pattern and to determine if irrigation can be identified that corresponds to the geometric pattern if a geometric pattern is determined.

In another example, the at least one processing unit is further configured to execute instructions to send a communication to a device of a user when irrigation is identified that corresponds to the geometric pattern.

In another example, the at least one processing unit is further configured to execute instructions to check for a potential application pass issue for a particular field by determining if crop yield for the field has a geometric pattern and to determine if an application pass can be identified that corresponds to the geometric pattern.

In another example, the at least one processing unit is further configured to execute instructions to send a communication to a device of a user when the application pass is identified that corresponds to the geometric pattern.

In one embodiment, a method for agricultural data analysis includes monitoring, with a system, agricultural data including yield and field data. The method further includes automatically determining, with the system, whether at least one correlation between different variables or parameters of the agricultural data exceeds a threshold and performing, with the system, analysis of the agricultural data to identify a category of man-made issues or other issues that have potentially caused the correlation when at least one correlation occurs between different variables or parameters of the agricultural data.

In one example, the method further includes checking, with the system, for a potential irrigation issue for a particular field by determining if crop yield for the field has a geometric pattern including a circular pattern or a linear pattern and determining if irrigation can be identified that corresponds to the geometric pattern if a geometric pattern is determined.

In another example, the method further includes sending a communication to a device of a user when irrigation is identified that corresponds to the geometric pattern.

In another example, the method further includes checking for a potential application pass issue for a particular field by determining if crop yield for the field has a geometric pattern and determining if an application pass can be identified that corresponds to the geometric pattern.

In another example, the method further includes sending a communication to a device of a user when the application pass is identified that corresponds to the geometric pattern.

In another embodiment, a computer system for agricultural data analysis includes a database for storing agricultural data including yield and field data and at least one processing unit coupled to the database. The at least one processing unit is configured to execute instructions to create at least one trial that potentially causes one or more correlations between different parameters or variables of the agricultural data in response to receiving a communication from a device and to allocate yield data based on different regions or strips created with the at least one trial. At least parameter or variable is varied in different regions or strips of a field to cause a correlation.

In one example, the at least one processing unit is configured to execute instructions to analyze the at least one created trial to determine whether the at one trial causes at least one correlation between yield data and a variable or parameter of the agricultural data for different regions or strips of a field.

In another example, the at least one processing unit is configured to execute instructions to receive the communication from a device in response to at least one user input that varies a parameter or variable of the agricultural data in different regions or strips of the field to create the at least one trial that causes a correlation between yield data and the parameter or variable.

In one example, the at least one processing unit is configured to execute instructions to receive the communication from a device in response to at least one user input that is received in real time during a farming operation that varies a parameter or variable of the agricultural data in different regions or strips of the field to create the at least one trial that causes a correlation between yield data and the parameter or variable.

In another example, the at least one processing unit is configured to execute instructions to generate and send data to the device to be displayed to the user for the at least one trial. The data presents at least one correlation for different regions or strips of the field of the least one trial or an absence of at least one correlation.

In another embodiment, a method of agricultural data analysis includes receiving, with a device, one or more user inputs after performing a farming operation or during the farming operation for creating at least one trial that potentially causes one or more correlations between different parameters or variables of agricultural data, creating, with the device, at least one trial for potentially causing one or more correlations between different variables or parameters of the agricultural data for field operations in response to the one or more user inputs, and allocating yield data based on different regions created with the at least one trial.

In another example, the method further includes analyzing the at least one created trial to determine whether the at one trial causes at least one correlation between yield data and a variable or parameter of the field data for different regions of the field.

In another example, the method further includes generating and displaying data to the user for the at least one trial.

In another example, the device displays the data including at least one correlation for different regions of the field of the least one trial or displays an absence of at least one correlation.

In another example, the device displays the data including a return on investment (ROI) tool that allows the user to determine an optimal region or optimal set of conditions for maximizing ROI.

BRIEF DESCRIPTION OF THE DRAWINGS

The present disclosure is illustrated by way of example, and not by way of limitation, in the figures of the accompanying drawings and in which:

FIG. 2 illustrates two views of an example logical organization of sets of instructions in main memory when an example mobile application is loaded for execution.

FIG. 5 depicts an example embodiment of a timeline view for data entry.

FIG. 6 depicts an example embodiment of a spreadsheet view for data entry.

DETAILED DESCRIPTION

Described herein are systems and methods for agricultural data analysis. In one embodiment, a method for agricultural data analysis includes monitoring, with a system, agricultural data including yield and field data (e.g., weather data, harvest data, planting data, fertilizer data, pesticide data, irrigation data, farming practice information, input cost information, and commodity price information, etc.). The method further includes automatically determining, with the system, whether at least one correlation between different variables or parameters of the agricultural data exceeds a threshold, and performing, with the system, analysis of the agricultural data to identify a category of man-made issues or other issues that have potentially caused the correlation when at least one correlation occurs between different variables or parameters of the agricultural data.

The system can then send a communication (e.g., email message, text message, map, etc) to a user's device or machine. The communication indicates that at least one correlation exceeds a threshold. The system may also send a comparison center breakdown when at least correlation exceeds a threshold. The system may also send a recommendation for taking an action in response to the at least correlation exceeding a threshold. The user can then make better decisions for farming operations (e.g., planting decisions, hybrid type selection, planting date, application of nutrients, etc.).

In the following description, numerous details are set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Figure 1:
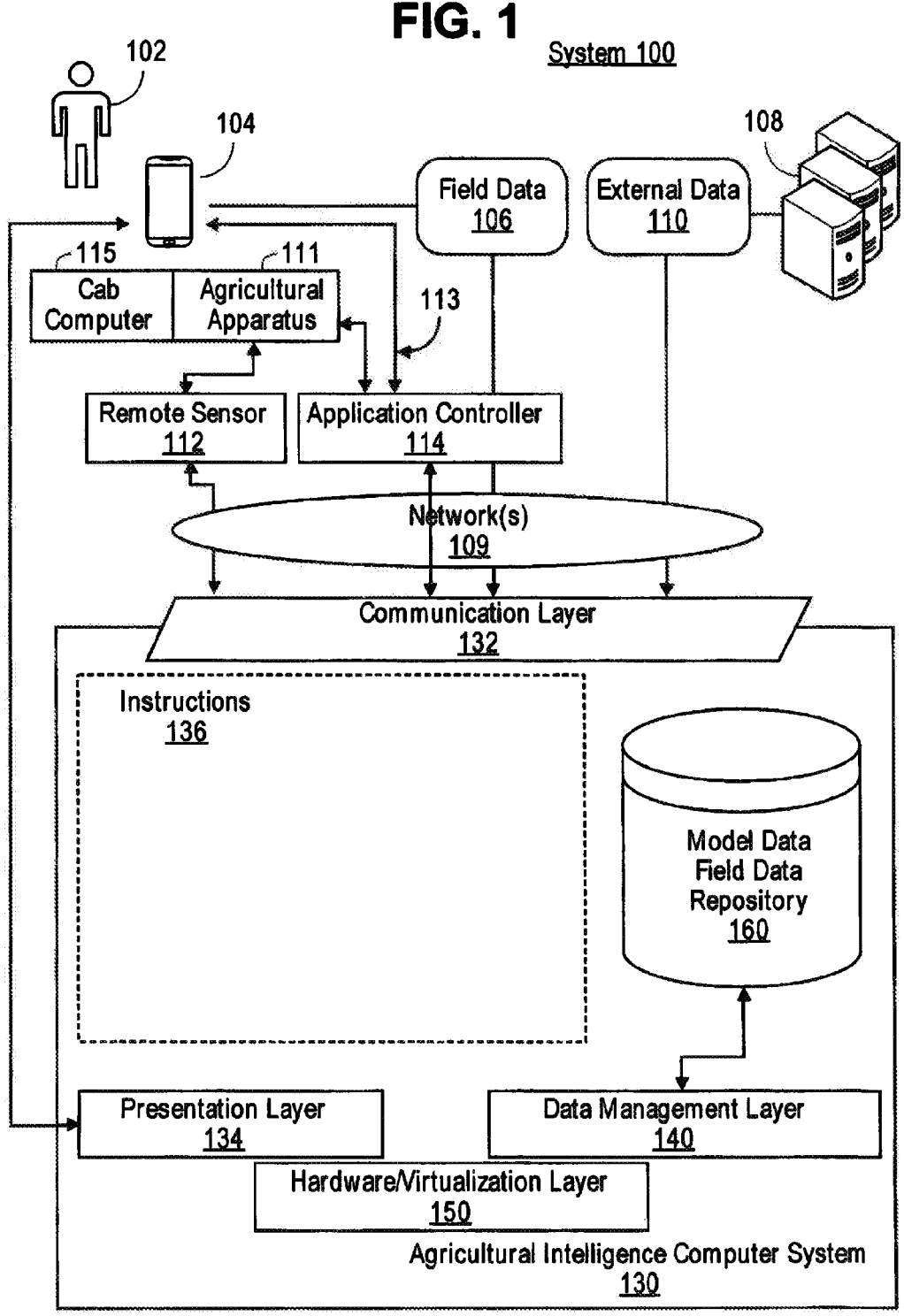
FIG. 1 illustrates an example computer system that is configured to perform the functions described herein, shown in a field environment with other apparatus with which the system may interoperate.

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, commodity price information (e.g., crop price, crop revenue), grain moisture, tillage practice, and previous growing season information (c) soil data (for example, type, composition, pH, organic matter (OM), cation exchange capacity (CEC)), (d) planting data (for example, planting date, seed(s) type, relative maturity (RM) of planted seed(s), seed population, input cost information (e.g., cost of seed)), and proprietary indices (e.g., ratio of seed population to a soil parameter), etc.) for the fields that are being monitored), (e) fertilizer data (for example, nutrient type (Nitrogen, Phosphorous, Potassium), application type, application date, amount, source, method, cost of nutrients), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, field conditions, input cost information, commodity price information, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive agricultural data including field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, instructions 136, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
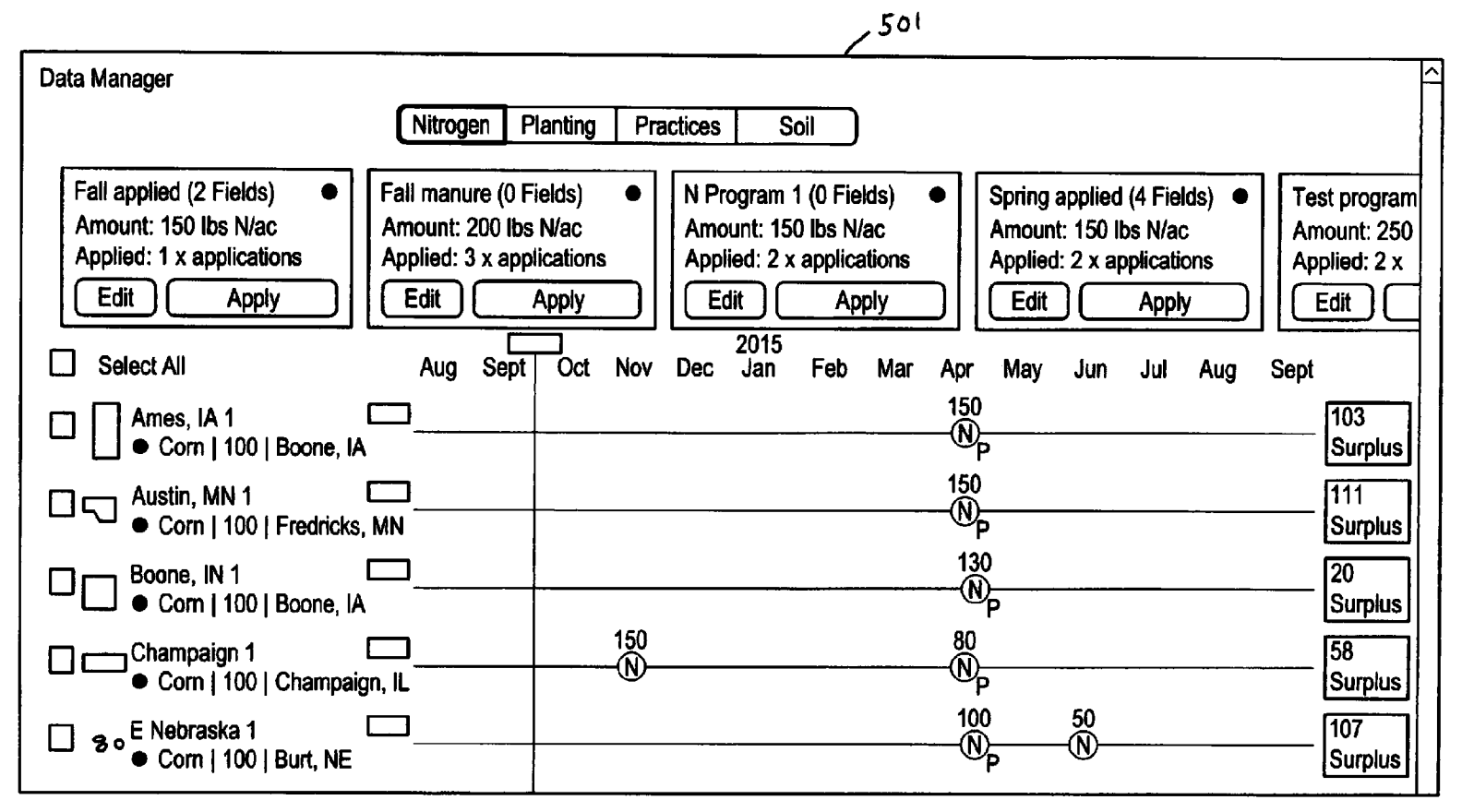

FIG. 5 depicts an example embodiment of a timeline view 501 for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 5, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Fall applied" program is no longer being applied to the top field. While the nitrogen application in early April may remain, updates to the "Fall applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model." in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model data may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
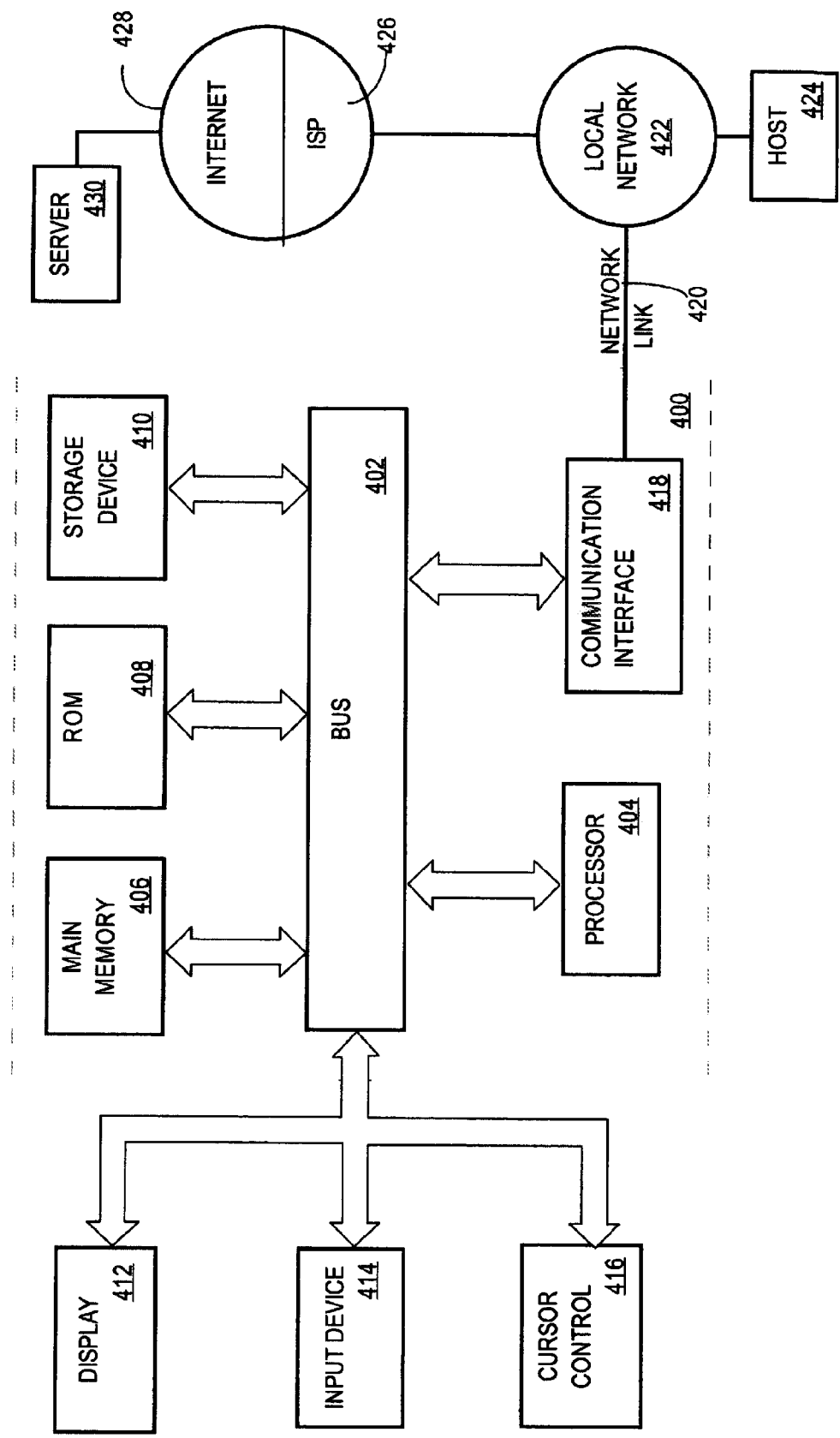
FIG. 4 is a block diagram that illustrates a computer system 400 upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies. In one example, instructions 136 include different types of instructions for monitoring field operations and performing agricultural data analysis. The instructions 136 may include agricultural data analysis instructions including instructions for performing the operations of the methods described herein. The instructions 136 can be included with the programmed instructions of the layer 150.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally and/or alternatively, a script may be sent directly to cab computer 115 from mobile computer application 200 and/or uploaded to one or more data servers and stored for further use. In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include correlations between yield and another parameter or variable of agricultural data, yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In another embodiment, sensors 112 and controllers 114 may comprise weather devices for monitoring weather conditions of fields. For example, the apparatus disclosed in International Pat. Application No. PCT/US2016/029609 may be used, and the present disclosure assumes knowledge of those patent disclosures.

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
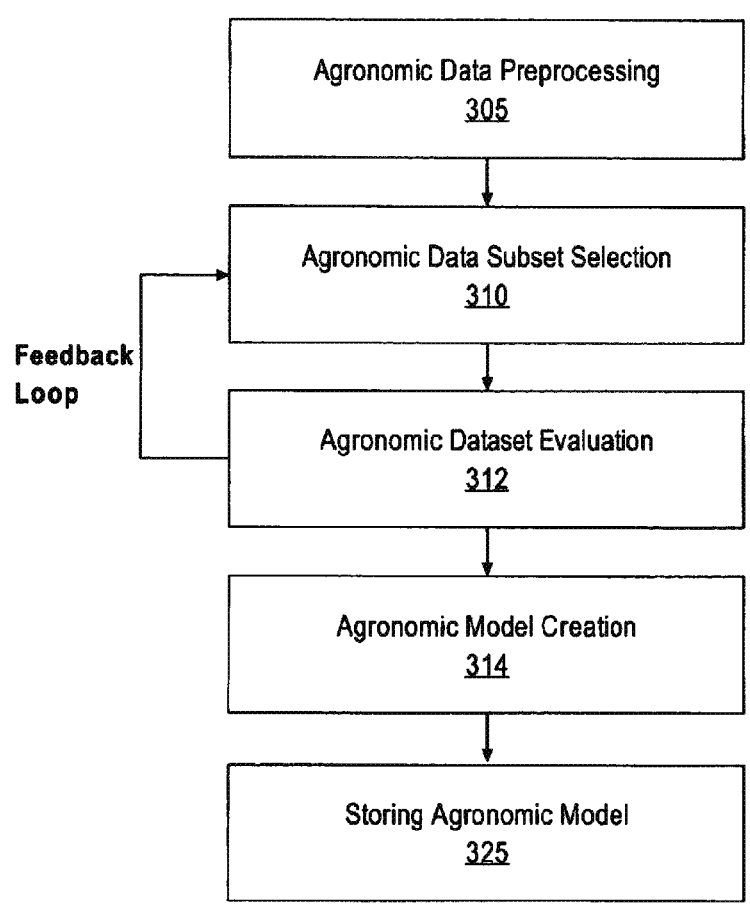
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an and colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Figure 7:
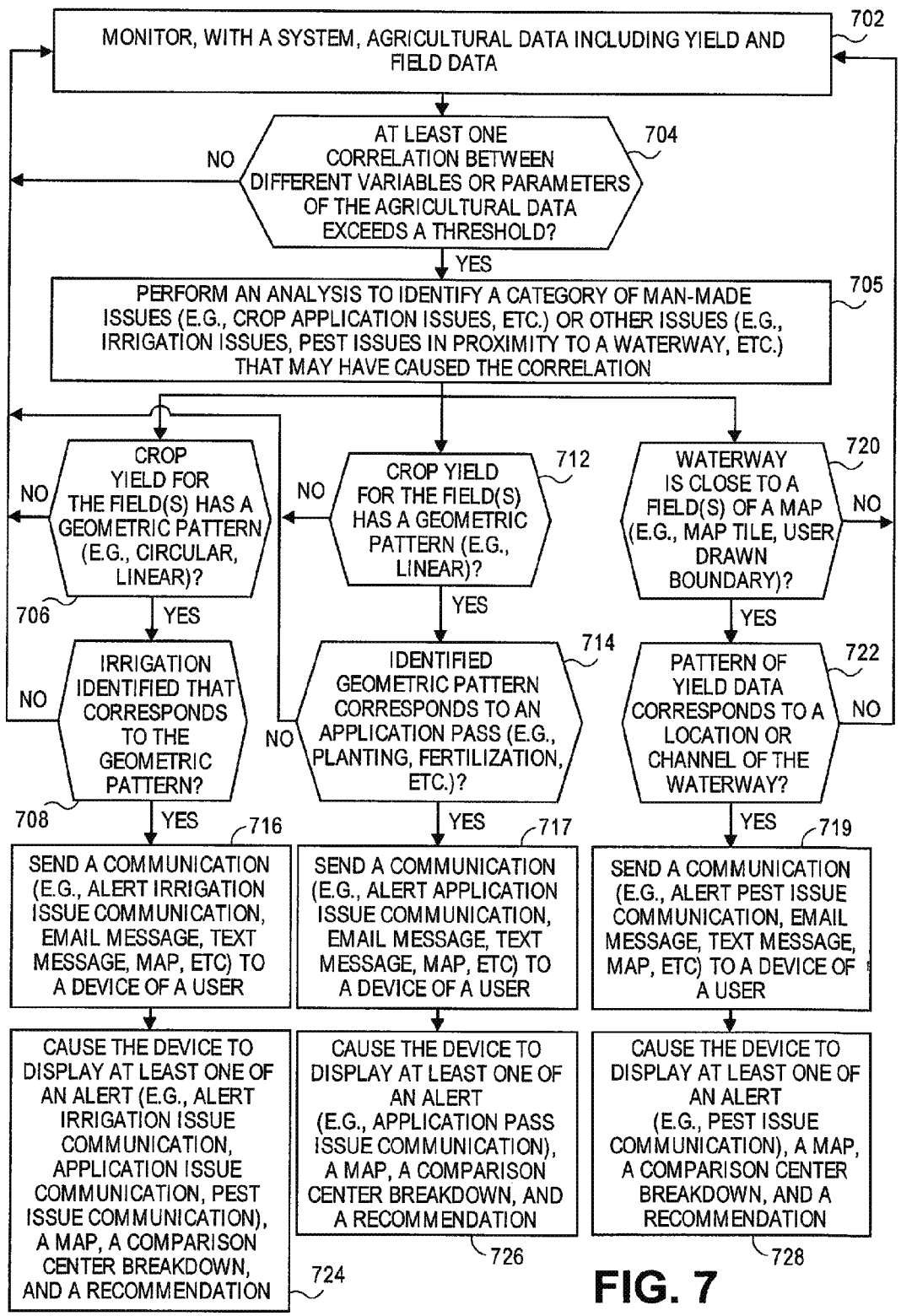
FIG. 7 illustrates a flow diagram of one embodiment for a method 700 of automatically identifying one or more correlations for field operations.

FIG. 7 illustrates a flow diagram of one embodiment for a method 700 of automatically identifying one or more correlations for field operations. The method 700 is performed by processing logic that may comprise hardware (circuitry, dedicated logic, etc.), software (such as is run on a general purpose computer system or a dedicated machine or a device), or a combination of both. In one embodiment, the method 700 is performed by processing logic of at least one data processing system (e.g., computer system 130, computer system 400, field manager computing device 104, cab computer 115, application controller 114, apparatus 111, etc). The system or device executes instructions of a software application or program with processing logic. The software application or program can be initiated by a system or may notify an operator or user of a machine (e.g., tractor, planter, combine) depending on whether one or more correlations are determined.

At block 702, a system monitors agricultural data including yield and and field data (e.g., identification data, harvest data, planting data, fertilizer data, pesticide data, irrigation data, and weather data, farming practice information, input cost information, commodity price information, etc.). At block 704, the system (or device) automatically determines whether at least one correlation between different variables or parameters of the agricultural data exceeds a threshold. For example, a correlation between yield data and a farm practice variable (e.g., planting data, applied nutrients) of field data may have exceeded a threshold. The correlation may be defined by empirical data, a certain yield differential between different values of a variable or parameter, or a $R^2$ value may exceed a threshold value. In this case, certain $R^2$ values between 0 and 1 (e.g., 0.8, 0.9) indicate a strong correlation. If so, then the system (or device) at block 705 performs an analysis (e.g., geometric analysis) to identify a category of man-made issues (e.g., crop application issues, etc.) or other issues (e.g., irrigation issues, pest issues in proximity to a waterway, etc.) that may have caused the correlation. If no correlation between different variables or parameters of the agricultural data exceeds a threshold then the method returns to block 702.

In one example, the system (or device) checks for a potential irrigation issue for a particular field(s) by determining if crop yield for the field(s) has a geometric pattern (e.g., circular pattern, linear pattern) at block 706. Irrigation issues may result from a faulty or damaged pivot of an irrigation system. If a geometric pattern is determined, then the system (or device) determines if irrigation can be identified that corresponds to the geometric pattern at block 708. If the system determines a geometric pattern and identifies irrigation that corresponds to the geometric pattern, then a communication (e.g., alert irrigation issue communication, email message, text message, map, etc) is sent to a device of a user at block 716. The communication indicates that at least one correlation exceeds a threshold. The system may also send a comparison center breakdown when at least one correlation exceeds a threshold. The system may also send a recommendation for taking an action in response to the at least correlation exceeding a threshold. The communication may include an alert, maps, a comparison center breakdown, and a recommendation. The device of the user then causes a display device of the device to display at least one of an alert (e.g., alert irrigation issue communication), a map, a comparison center breakdown, and a recommendation at block 724. A recommendation may be generated and displayed in response to a user selection of a sub-category or variable that is an input parameter or farming practice parameter. The system or device may receive a user input in response to the communication, comparison center breakdown, or recommendation. If no geometric pattern is determined at block 706 or no irrigation is identified at block 708, then the method returns to block 702.

In another example, the system (or device) checks for a potential application pass issue for a particular field(s) by determining if crop yield for the field(s) has a geometric pattern (e.g., linear pattern) at block 712. The system (or device) then determines if the identified geometric pattern corresponds to an application pass (e.g., planting, fertilization, etc.) at block 714. If the system determines a geometric pattern and identifies that the geometric pattern corresponds to an application pass, then a communication (e.g., alert application issue communication, email message, text message, map, etc) is sent to a user at block 717. The communication indicates that at least one correlation exceeds a threshold. The system may also send a comparison center breakdown when at least one correlation exceeds a threshold. The system may also send a recommendation for taking an action in response to the at least correlation exceeding a threshold. The communication may include an alert, maps, a comparison center breakdown, and a recommendation. The device of the user then causes a display device of the device to display at least one of an alert (e.g., application pass issue communication), a map, a comparison center breakdown, and a recommendation at block 726. The system or device may receive a user input in response to the communication, comparison center breakdown, or recommendation. A recommendation may be generated and displayed in response to a user selection of a sub-category or variable that is an input parameter or farming practice parameter of field data. If no geometric pattern is determined at block 706 or no geometric pattern is identified that corresponds to an application pass at block 714, then the method returns to block 702.

One example of an application pass issue is a mechanical issue during planting of seed. The system may determine a correlation between yield and a planting variable of planting data. This correlation may help identify that a planter overplanted certain regions of a field likely due to a mechanical error while planting. The overplanted regions may correlate with other variables or parameters such as yield. This correlation indicates a mechanical issue such as not having clutches, etc that causes the wasting of a certain number of bags of seed. In another example, a seed population deviation across different regions of a field can be tied or correlated with a failure to curve-adjust.

In another example, the system checks for a potential pest or insect issue for a particular field(s) by determining if a waterway is close to a field(s) of a map (e.g., map tile, user drawn boundary) at block 720. The system then determines if a pattern of yield data corresponds to a location or channel of the waterway at block 722. If the system identifies a waterway close to a field(s) and determines that a pattern (e.g., pattern of yield data) corresponds to a location or channel of the waterway, then a communication (e.g., alert pest issue communication, email message, text message, map, etc) is sent to a user's device at block 719. The communication indicates that at least one correlation exceeds a threshold. The system may also send a comparison center breakdown when at least one correlation exceeds a threshold. The system may also send a recommendation for taking an action in response to the at least one correlation exceeding a threshold. The communication may include an alert, maps, a comparison center breakdown, and a recommendation. The device of the user then causes a display device of the device to display at least one of an alert (e.g., pest issue communication), a map, a comparison center breakdown, and a recommendation at block 728. A recommendation may be generated and displayed in response to a user selection of a sub-category or variable that is an input parameter or farming practice parameter. The system (or device) may receive a user input in response to the communication, comparison center breakdown, or recommendation. If no waterway is identified at block 720 or no pattern corresponds to a location or channel of the waterway at block 722, then the method returns to block 702.

Upon determining that at least one correlation between different variables or parameters of the agricultural data exceeds a threshold, the system (or device) can perform the operations of blocks 706, 712, and 720 simultaneously or sequentially.

The method 700 returns to block 702 if no correlation is determined at block 704 that exceeds a threshold.

Figure 8:
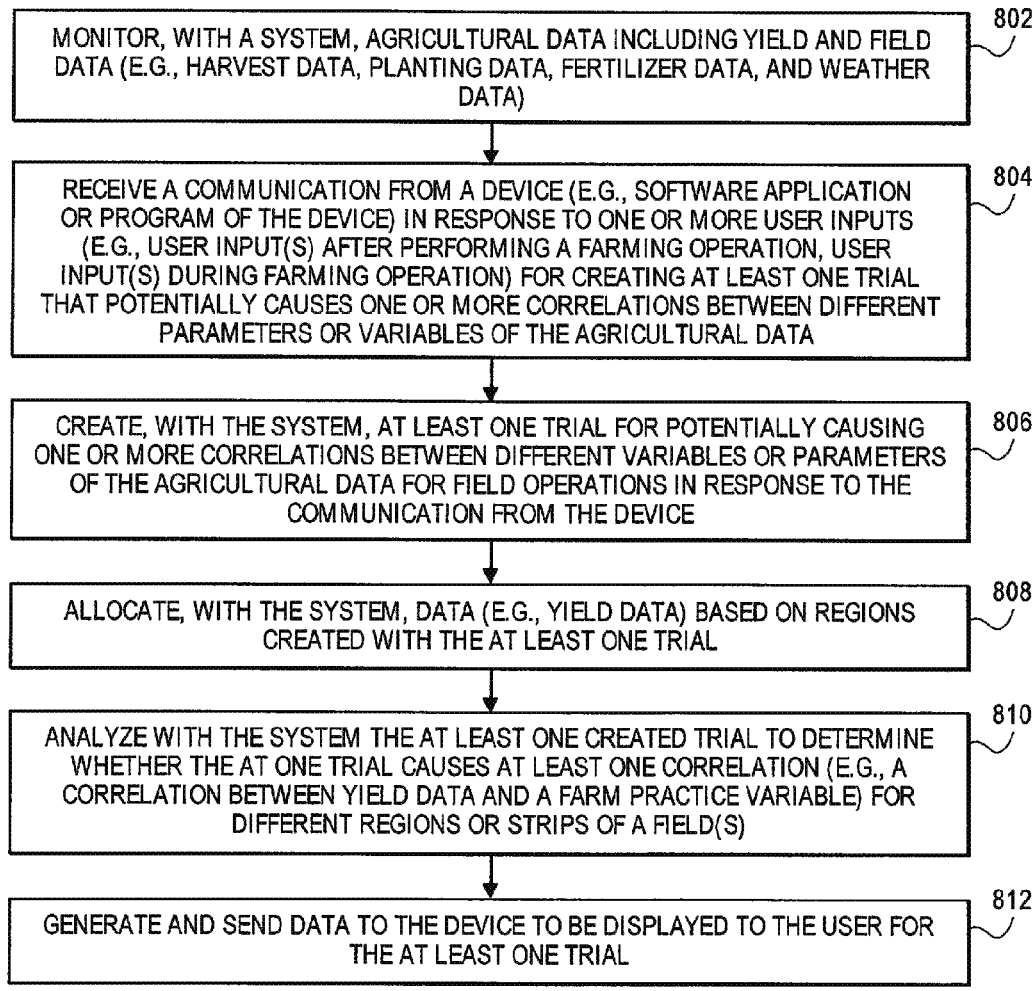
FIG. 8 illustrates a flow diagram of one embodiment for a method 800 of creating trials for causing one or more correlations between different variables or parameters of agricultural data.

FIG. 8 illustrates a flow diagram of one embodiment for a method 800 of creating trials for causing one or more correlations between different variables or parameters of agricultural data. The method 800 is performed by processing logic that may comprise hardware (circuitry, dedicated logic, etc.), software (such as is run on a general purpose computer system or a dedicated machine or a device), or a combination of both. In one embodiment, the method 800 is performed by processing logic of at least one data processing system (e.g., computer system 130, computer system 400, field manager computing device 104, cab computer 115, application controller 114, apparatus 111, etc). The system or device executes instructions of a software application or program with processing logic.

At block 802, a system monitors agricultural data including yield and field data (e.g., harvest data, planting data, fertilizer data, weather data, input cost information, commodity price information, etc.). At block 804, the system creates at least one trial that potentially causes one or more correlations between different parameters or variables of the agricultural data in response to receiving a communication from a device (e.g., software application or program of the device) caused by one or more user inputs (e.g., user input(s) after performing a farming operation, user input(s) during farming operation). For example, a user may vary a parameter or variable in different regions or strips of a field(s) to create a trial that causes a correlation between yield data and the parameter or variable of the agricultural data (e.g., a farm practice variable, planting information, application rate, products applied, planting depth study, applied nutrients, etc.). In one example, a user changes a variable (e.g., seed population, seed density, applied nitrogen) in different regions or strips of a field to cause the correlation. The user can create the trial after performing a farming operation (e.g., planting, tillage, applied nutrients, etc). In one example, a user draws a polygon on a map of a field to assign a region to the polygon and then changes a variable for that polygon. A northern region of a field can be region 1 while a southern region of a field can be region 2. In another example, a user can label as a region a ponded area that was planted in a certain month. A user can create any customized region or setting; the settings may be implemented by the system 130 (e.g., a commanded seed population) or implemented by the user (e.g., a closing system downforce setting or a planter depth setting).

Alternatively, a user creates a trial live in real time while performing the farming operation. In one example, a user selects a record option from a device (e.g., display device in a machine, tablet device, etc.) to initiate a first region during a first operation (e.g., planting) and then selects a record or stop option at a later time to terminate an area defined by the first region. The user can then define additional regions for a field or fields for the first operation. The data associated with the different region is then provided to a system (e.g., cloud based system). At a later time or date, a second operation (e.g., harvesting, fertilization, etc.) is performed with a different machine (or same machine) and the data (e.g., yield) is automatically partitioned into the previously defined regions.

At block 806, the system creates at least one trial for potentially causing one or more correlations between different variables or parameters of the agricultural data for field operations in response to the communication from the device that is generated in response to the user inputs (e.g., user input(s) after performing a farming operation, user input(s) during farming operation). At block 808, the system allocates data (e.g., yield data) based on regions created with the at least one trial. For example, yield data for a subsequent farming operation (e.g., harvesting) is allocated in accordance with regions created by the trial. At block 810, the system analyzes the at least one created trial to determine whether the at one trial causes at least one correlation (e.g., a correlation between yield data and a farm practice variable) for different regions or strips of a field(s). At block 812, the system generates and sends data to the device to be displayed to the user for the at least one trial. The data may present at least one correlation for different regions or strips of the field(s) of the least one trial or may present an absence of at least one correlation. The data presented may be a return on investment (ROI) tool that allows the user to determine an optimal region or optimal set of conditions for maximizing ROI. In one example, a first region of a field has no applied nutrients and a first yield. A second region of the field has a certain amount of applied nutrients and a second yield. The ROI tool allows the user to determine if the additional cost of the applied nutrients increases the yield sufficiently (e.g., increased yield equals second yield minus first yield) to justify planting future crops with the additional cost of the applied nutrients.

Figure 9:
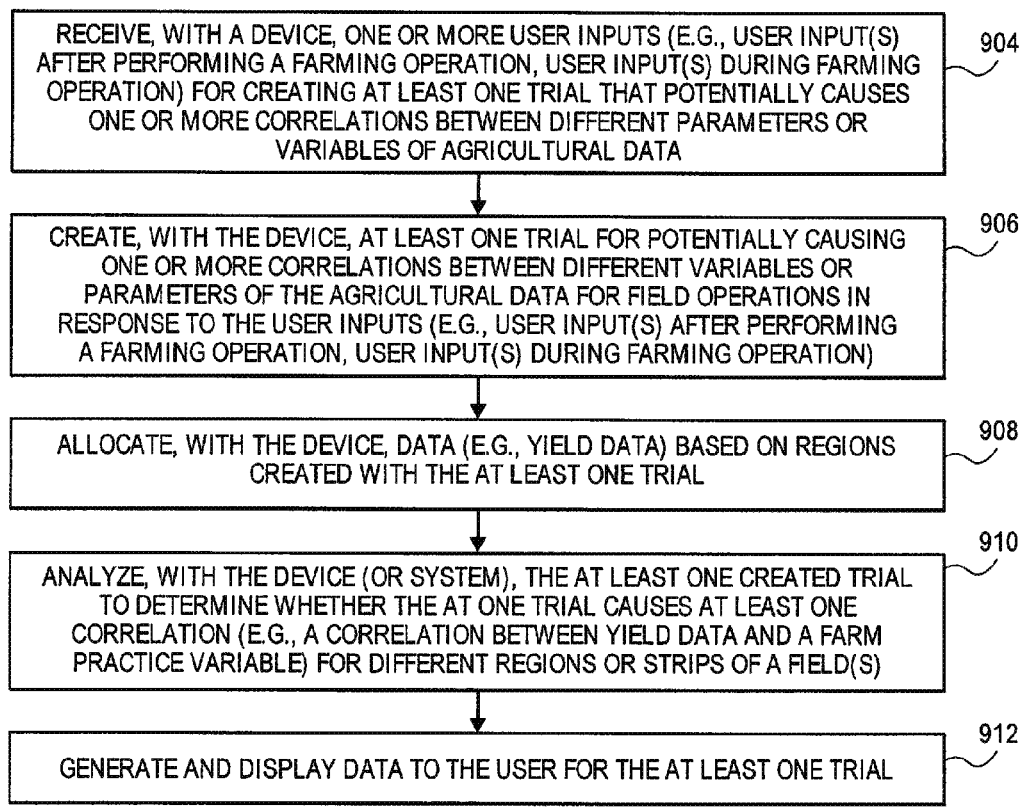
FIG. 9 illustrates a flow diagram of one embodiment for a method 900 of creating trials for causing one or more correlations between different variables or parameters of agricultural data.

FIG. 9 illustrates a flow diagram of one embodiment for a method 900 of creating trials for causing one or more correlations between different variables or parameters of agricultural data. The method 900 is performed by processing logic that may comprise hardware (circuitry, dedicated logic, etc.), software (such as is run on a general purpose computer system or a dedicated machine or a device), or a combination of both. In one embodiment, the method 900 is performed by processing logic of at least one data processing system (e.g., computer system 130, computer system 400, field manager computing device 104, cab computer 115, application controller 114, apparatus 111, etc). The system or device executes instructions of a software application or program with processing logic.

A system monitors agricultural data including yield and field data (e.g., harvest data, planting data, fertilizer data, weather data, input cost information, and commodity price information, etc.). At block 904, a device of the user receives one or more user inputs (e.g., user input(s) after performing a farming operation, user input(s) during forming operation) for creating at least one trial that potentially causes one or more correlations between different parameters or variables. For example, a user may vary a parameter or variable in different regions or strips of a field(s) to create a trial that causes a correlation between yield data and a farm practice variable of field data (e.g., planting information, application rate, products applied, planting depth study, applied nutrients). In one example, a user changes a variable (e.g., seed population, seed density, applied nitrogen) in different regions or strips of a field to cause the correlation. The user can create the trial after performing a farming operation (e.g., planting, tillage, applied nutrients, etc). In one example, a user draws a polygon on a map of a field to assign a region to the polygon and then changes a variable for that region.

Alternatively, a user creates a trial live in real time while performing the farming operation. In one example, a user selects a record option from a device (e.g., display device in a machine, tablet device, etc.) to initiate a first region during a first operation (e.g., planting) and then selects a record or stop option at a later time to terminate an area defined by the first region. The user can then define additional regions for a field or fields for the first operation. The data associated with the different region is then provided to a system (e.g., cloud based system). At a later time or date, a second operation (e.g., harvesting, fertilization, etc.) is performed with a different machine (or same machine) and the data (e.g., yield) is automatically partitioned into the previously defined regions.

At block 906, the device creates at least one trial for potentially causing one or more correlations between different variables or parameters of the agricultural data for field operations in response to the user inputs (e.g., user input(s) after performing a farming operation, user input(s) during farming operation). At block 908, the device allocates data (e.g., yield data) based on regions created with the at least one trial. For example, yield data for a subsequent farming operation (e.g., harvesting) is allocated in accordance with regions created by the trial. At block 910, the device (or system) analyzes the at least one created trial to determine whether the at one trial causes at least one correlation (e.g., a correlation between yield data and a farm practice variable) for different regions or strips of a field(s). At block 912, the device generates and displays data to the user for the at least one trial. The device may present data including at least one correlation for different regions or strips of the field(s) of the least one trial or may present an absence of at least one correlation. The data presented may be a return on investment (ROI) tool that allows the user to determine an optimal region or optimal set of conditions for maximizing ROI. In one example, a first region of a field has no applied nutrients and a first yield. A second region of the field has a certain amount of applied nutrients and a second yield. The ROI tools allows the user to determine if the additional cost of the applied nutrients increases the yield sufficiently (e.g., increased yield equals second yield minus first yield) to justify planting future crops with the additional cost of the applied nutrients. The data presented may also comprise a comparison center as described further herein.

Figure 10:
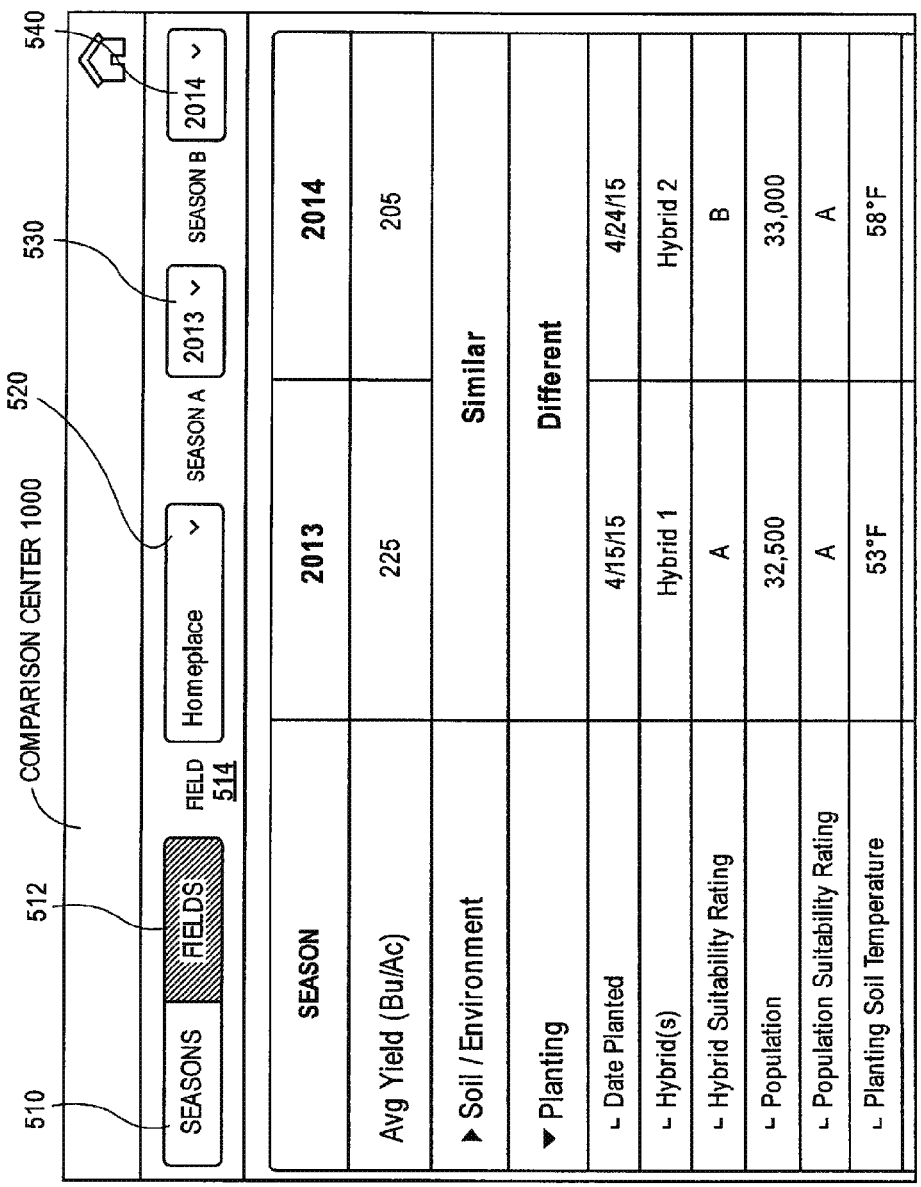
FIG. 10 illustrates an exemplary comparison center user interface 1000 in accordance with one embodiment.
Figure 11:
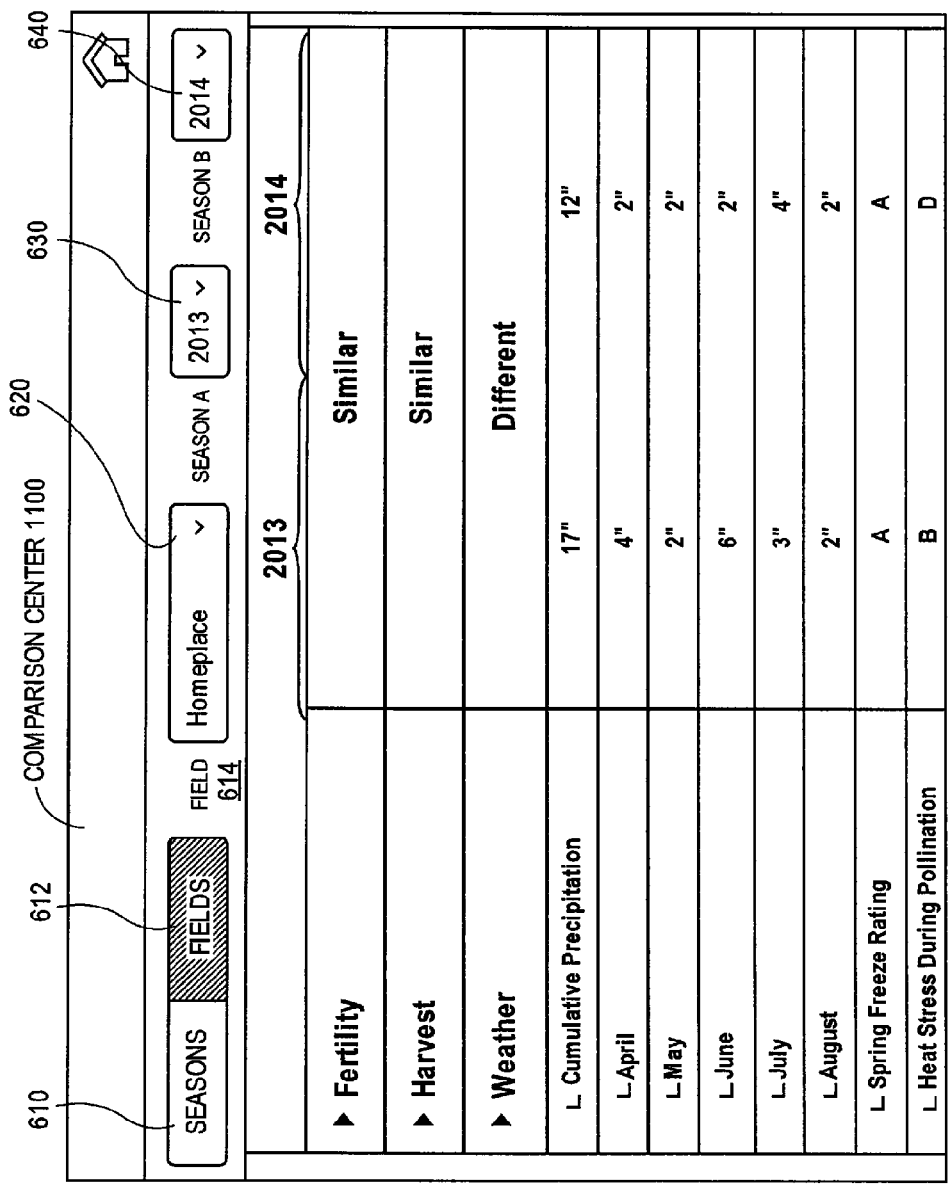
FIG. 11 illustrates an exemplary comparison center user interface 1100 in accordance with one embodiment.

Embodiments of exemplary comparison center user interfaces are illustrated in FIGS. 10 and 11 and described in more detail below. The comparison center user interface preferably includes an agronomic result (e.g., a yield value such as average yield in bushels per acre, economic yield in dollars per acre) corresponding to a plurality of criteria (e.g., seasons, fields, sub-field management zones, soil types, etc). Each comparison center user interface preferably includes categories (e.g., soil/environment, planting, fertility, harvest, weather) of available data for a plurality of criteria (e.g., seasons, fields, sub-field management zones, soil types, etc). Each category can preferably be expanded by the operator (e.g., by clicking or tapping) in order to display detailed information falling within the category. The "Soil/Environment" category may preferably be expanded to display relevant data preferably including soil type, tiling practices, tillage practices. The "Harvest" category may preferably be expanded to display relevant data preferably including harvest start date, harvest completion date, harvest practices, harvesting equipment. The "Planting" category may preferably be expanded to display relevant data preferably including data planted, hybrid (e.g., seed type), population, population suitability rating (e.g., a numerical score indicating whether the population planted was appropriate for the field or management zone), and planting soil temperature. The "Fertility" category may preferably be expanded to display relevant dating, preferably including cumulative precipitation (total and per month), spring freeze rating, and heat stress during population. For each category of data (e.g., Soil/Environment, Planting, Fertility, Harvest, Weather), the comparison center user interface preferably displays a comparison summary (e.g., "similar", "different", or a numerical or legendary similarity score) indicating the similarity of data between the data sets within the category for each criterion (e.g., season, field, soil type, sub-field management zone). The comparison summary is preferably determined based on the aggregate similarity of data in the category, and may be determined by comparing the aggregate similarity to a similarity threshold. As an illustrative example, the "Planting" category may include a comparison summary of "Different" may be determined by the operations of (a) assigning a numerical value to each item of data in the category according to a pre-determined association of numerical values to data ranges (e.g., assigning a numerical value to the cumulative precipitation data equal to the inches of rain accumulated throughout the season, assigning a value of 100 to a spring freeze rating of "A", assigning a value of 200 to a heat stress during pollination rating of "B"; (b) aggregating the determined numerical values (e.g., summing or averaging the determined numerical values) to obtain an aggregated numerical value; (c) comparing the aggregated numerical value to a predetermined numerical similarity threshold (e.g., 300); and (d) if the aggregated numerical value exceeds the numerical similarity threshold, selecting and displaying a comparison summary of "Different".

FIG. 10 illustrates an exemplary comparison center user interface 1000 in accordance with one embodiment. The comparison center user interface 1000 is displayed on a monitor (e.g., cab computer 115, display device, OEM display device, computing device, etc.) in a tractor cab of a machine or the comparison map 1000 is displayed on a user's device (e.g., device 104, tablet device, computing device, desktop computer, cellular phone, smart TV) that can be located at any location in order for the operator to make a farming decision for one or more fields. A seasons option 510 can be selected for displaying seasonal comparison data or a fields option 512 can be selected for displaying fields comparison data. A field region 514 includes a selectable option (e.g., homeplace 520) for displaying comparison data for a particular farm or field. A season A region includes a selectable option 530 (e.g., 2013) for displaying farming data for a particular year in a column 2013. A season B region includes a selectable option 540 (e.g., 2014) for displaying farming data for a particular year in a column 2014. In this example, columns 2013 and 2014 includes average yield (e.g., in bushels/acre), soil/environment, and planting conditions including date planted, hybrid(s), hybrid suitability rating, population, population suitability rating, and planting soil temperature. The system or device determines that the soil/environmental conditions are similar for seasons 2013 and 2014 while the planting conditions for seasons 2013 and 2014 are different. The operator can then correlate and/or compare the yield of 225 Bu/Ac in season 2013 with planting conditions for this season. In contrast, the lower yield of 205 Bu/Ac in season 2014 can be correlated with the planting conditions for this season. To optimize yield for future seasons, the operator may decide to use planting conditions similar to the planting conditions of season 2013.

FIG. 11 illustrates an exemplary comparison center user interface 1100 in accordance with one embodiment. The comparison center user interface 1100 is displayed on a monitor (e.g., display device, OEM display device, computing device, etc.) in a tractor cab of a machine or the comparison map 600 is displayed on a user's device (e.g., tablet device, computing device, desktop computer, cellular phone, smart TV) that can be located at any location in order for the operator to make a farming decision for one or more fields. A seasons option 610 can be selected for displaying seasonal comparison data or a fields option 612 can be selection for displaying fields comparison data. A field region 614 includes a selectable field option 620 (e.g., Homeplace) for displaying comparison data for a particular farm or field. A season A region includes a first selectable season option 630 (e.g., 2013) for displaying farming data for a particular year in a column (e.g., 2013 as illustrated). A season B region includes a second selectable season option 640 (e.g., 2014) for displaying farming data for a particular year in a column (e.g., 2014 as illustrated). In this example, columns 2013 and 2014 include fertility data, harvest data, and weather data including cumulative precipitation, monthly precipitation, spring freeze rating, and heat stress during pollination. The system or device determines that the fertility and harvest conditions are similar for seasons 2013 and 2014 while the weather conditions for seasons 2013 and 2014 are different. The operator can then correlate and/or compare the yield of 225 Bu/Ac in season 2013 with planting and weather conditions for the 2013 season. In contrast, the lower yield of 205 Bu/Ac in season 2014 can be correlated with the planting and weather conditions for the 2014 season.

In some embodiments, the operations of the method(s) disclosed herein can be altered, modified, combined, or deleted. The methods in embodiments of the present disclosure may be performed with a device, an apparatus, or data processing system as described herein. The device, apparatus, or data processing system may be a conventional, general-purpose computer system or special purpose computers, which are designed or programmed to perform only one function, may also be used.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

The invention claimed is:

1. A computer-implemented method of monitoring operations of agricultural regions, comprising:
 receiving, by a processor, a real-time identification of one or more agricultural regions from a first device traveling in the one or more agricultural regions;
 transmitting data for a first graphical user interface (GUI) to be displayed to a user, the first GUI comprising one or more selectable user interface objects enabling the user to identify changes to one or more of an agricultural region of the one or more agricultural regions, soil, crops, tillage, or nutrient practices, wherein the changes can be used to generate trial information for an agricultural trial for the one or more agricultural regions;

receiving, by the processor, trial information from the user, wherein the trial information is generated based on the changes identified via selection of one or more of the user interface objects;

sending, by the processor, a command to vary a value of a specific agricultural variable in each of the one or more agricultural regions based on the received trial information;

receiving, after the sending, current yield data of a crop yield for each of the one or more agricultural regions;

determining a correlation between the specific agricultural variable and the crop yield over the one or more agricultural regions based on the command and the current yield data;

receiving cost data related to the specific agricultural variable;

generating a recommendation for improving the crop yield in the one or more agricultural regions based on the correlation and the cost data;

sending data related to the recommendation to a second device for implementing the recommendation in the one or more agricultural regions or a user device coupled to the second device, wherein the data is for a second GUI that displays information corresponding to the recommendation for the one or more agricultural regions.

2. The computer-implemented method of claim 1, the specific agricultural variable being a farming practice, a planting parameter, or a nutrient application parameter.

3. The computer-implemented method of claim 1, the receiving the real-time identification comprising:
receiving, in real time, a first selection of an option and a first indication of a first location of the first device;
receiving, in real time, a second selection of the option and a second indication of a second location of the first device different from the first location,
the real-time identification of an agricultural region of the one or more agricultural regions being based on the first location and the second location of the first device.

4. The computer-implemented method of claim 1, the first device or a separate device physically attached to the first device being configured to perform a farming operation corresponding to the specific agricultural variable.

5. The computer-implemented method of claim 1,
the command being sent to a third device,
the third device being configured to vary the value of the specific agricultural variable in an agricultural region,
the current yield data being received from the third device,
the current yield data being already partitioned based on the real-time identification of the one or more agricultural regions when received from the third device.

6. The computer-implemented method of claim 1,
the command indicating creating one or more trials involving varying a value of each of one or more agricultural variables,
the determining comprising detecting a correlation between an agricultural variable of the one or more agricultural variables and the crop yield from a trial of the one or more trials.

7. The computer-implemented method of claim 1, further comprising
receiving price data related to the crop yield,
the recommendation being generated further based on the price data.

8. The computer-implemented method of claim 1, further comprising sending, to the second device, information indicating a relationship between a cost of varying a value of the specific agricultural variable in an agricultural region and a profit of an increased crop yield, where the increased crop yield is based on comparing a first yield corresponding to not varying the value of the specific agricultural variable in the agricultural region with a second yield corresponding to varying the value of the specific agricultural variable in the agricultural region.

9. The computer-implemented method of claim 1, further comprising causing a display of a comparison screen including values of a plurality of agricultural variables for two agricultural regions of the one or more agricultural regions or for two seasons of an agricultural region of the one or more agricultural regions.

10. The computer-implemented method of claim 9, the plurality of agricultural variables including the specific agricultural variable and a second agricultural variable a value of which was not varied in the trial.

11. One or more non-transitory computer-readable storage media storing instructions which when executed cause one or more processors to perform a method of monitoring operations of agricultural regions, the method comprising:
receiving a real-time identification of one or more agricultural regions from a first device traveling in the one or more agricultural regions;
transmitting data for a first graphical user interface (GUI) to be displayed to a user, the first GUI comprising one or more selectable user interface objects enabling the user to identify changes to one or more of an agricultural region of the one or more agricultural regions, soil, crops, tillage, or nutrient practices, wherein the changes can be used to generate trial information for an agricultural trial for the one or more agricultural regions;
receiving trial information from the user, wherein the trial information is generated based on the changes identified via selection of one or more of the user interface objects;
sending a command to vary a value of a specific agricultural variable in each of the one or more agricultural regions based on the received trial information;
receiving, after the sending, current yield data of a crop yield for each of the one or more agricultural regions;
determining a correlation between the specific agricultural variable and the crop yield over the one or more agricultural regions based on the command and the current yield data;
receiving cost data related to the specific agricultural variable;
generating a recommendation for improving the crop yield in the one or more agricultural regions based on the correlation and the cost data;
sending data related to the recommendation to a second device for implementing the recommendation in the one or more agricultural regions or a user device coupled to the second device, wherein the data is for a second GUI that displays information that corresponds to the recommendation for the one or more agricultural regions.

12. The one or more non-transitory computer-readable storage media of claim 11, the specific agricultural variable being a farming practice, a planting parameter, or a nutrient application parameter.

13. The one or more non-transitory computer-readable storage media of claim 11, the receiving the real-time identification comprising:

receiving, in real time, a first selection of an option and a first indication of a first location of the first device;

receiving, in real time, a second selection of the option and a second indication of a second location of the first device different from the first location, the real-time identification of an agricultural region of the one or more agricultural regions being based on the first location and the second location of the first device.

14. The one or more non-transitory computer-readable storage media of claim 11, the first device or a separate device physically attached to the first device being configured to perform a farming operation corresponding to the specific agricultural variable.

15. The one or more non-transitory computer-readable storage media of claim 11, the command being sent to a third device, the third device being configured to vary the value of the specific agricultural variable in an agricultural region, the current yield data being received from the third device, the current yield data being already partitioned based on the real-time identification of the one or more agricultural regions when received from the third device.

16. The one or more non-transitory computer-readable storage media of claim 11, the command indicating creating one or more trials involving varying a value of each of one or more agricultural variables, the determining comprising detecting a correlation between an agricultural variable of the one or more agricultural variables and the crop yield from a trial of the one or more trials.

17. The one or more non-transitory computer-readable storage media of claim 11, the method further comprising receiving price data related to the crop yield, the recommendation being generated further based on the price data.

18. The one or more non-transitory computer-readable storage media of claim 11, the method further comprising sending, to the second device, information indicating a relationship between a cost of varying a value of the specific agricultural variable in an agricultural region and a profit of an increased crop yield, where the increased crop yield is based on comparing a first yield corresponding to not varying the value of the specific agricultural variable in the agricultural region with a second yield corresponding to varying the value of the specific agricultural variable in the agricultural region.

19. The one or more non-transitory computer-readable storage media of claim 11, the method further comprising causing a display of a comparison screen including values of a plurality of agricultural variables for two agricultural regions of the one or more agricultural regions or for two seasons of an agricultural region of the one or more agricultural regions.

20. The one or more non-transitory computer-readable storage media of claim 19, the plurality of agricultural variables including the specific agricultural variable and a second agricultural variable a value of which was not varied in the trial.

* * * * *